US012425779B2

(12) United States Patent
Chang et al.

(10) Patent No.: US 12,425,779 B2
(45) Date of Patent: Sep. 23, 2025

(54) HEARING AID DEVICE WITH FUNCTIONS OF ANTI-NOISE AND 3D SOUND RECOGNITION

(71) Applicant: CHUNG YUAN CHRISTIAN UNIVERSITY, Taoyuan (TW)

(72) Inventors: Cheng-Yuan Chang, Taoyuan (TW); Chong-Rui Huang, Taoyuan (TW)

(73) Assignee: CHUNG YUAN CHRISTIAN UNIVERSITY, Taoyuan (TW)

( * ) Notice: Subject to any disclaimer, the term of this patent is extended or adjusted under 35 U.S.C. 154(b) by 523 days.

(21) Appl. No.: 18/050,077

(22) Filed: Oct. 27, 2022

(65) Prior Publication Data

US 2024/0056745 A1 Feb. 15, 2024

(30) Foreign Application Priority Data

Aug. 10, 2022 (TW) ................................. 111130021

(51) Int. Cl.
*H04R 25/00* (2006.01)

(52) U.S. Cl.
CPC ......... *H04R 25/407* (2013.01); *H04R 25/505* (2013.01); *H04R 2460/01* (2013.01)

(58) Field of Classification Search
CPC ............................ H04R 25/407; H04R 25/505
See application file for complete search history.

(56) References Cited

U.S. PATENT DOCUMENTS 10,869,139 B2 12/2020 Chiu et al.
2013/0083944 A1* 4/2013 Kvist .................... H04R 3/005 381/92

FOREIGN PATENT DOCUMENTS

JP 2000-032597 1/2000
JP 2020-534574 11/2020

OTHER PUBLICATIONS

Examination Report for foreign counterpart application JP2022-194219, date Feb. 6, 2024.
(English translation) Examination Report for foreign counterpart application JP2022-194219, date Feb. 6, 2024.

* cited by examiner

*Primary Examiner* — Rasha S Al Aubaidi

(57) ABSTRACT

A hearing aid device with functions of anti-noise and 3D sound recognition is disclosed. The hearing aid device comprises N microphones, at least one A/D converter, a modular electronic device, a D/A converter, and a loudspeaker. According to the present invention, the modular electronic device is configured for generating N second audio signals based on N first audio signals and a HRTF signal, and then summing up the N second audio signals to a reference signal. Moreover, the modular electronic device is further configured for generating a first output signal after applying an ANC process to the reference signal, converting the reference signal to a second output signal, and then generating an output signal based on the first output signal and the second output signal. Consequently, the loudspeaker broadcasts a sound according to the output signal.

16 Claims, 8 Drawing Sheets

HEARING AID DEVICE WITH FUNCTIONS OF ANTI-NOISE AND 3D SOUND RECOGNITION

BACKGROUND OF THE INVENTION

1. Field of the Invention

The present invention relates to the technology field of hearing aid devices, and more particularly to a hearing aid device with functions of anti-noise and 3D sound recognition.

2. Description of the Prior Art

It is well known that, hearing aid is a battery-powered electronic device designed to improve the hearing ability of a hearing-impaired person. On the other hand, the developed and advanced science technologies results in the production of high-technology electronic devices, convenient traffic transport, and various industrial articles, but also lead our living environment to be flooded with noise pollution. It is worth explaining that, a normal man is able to pay attention on a specific kind of sound (e.g., speaking sound) he interests through the spatial hearing thereof. Spatial hearing is the capacity of the auditory system to interpret or exploit different spatial paths by which sounds may reach the head. However, for a hearing-impaired person wearing a hearing aid device, it is still difficult to clearly hear what someone else said in a specific environment flooded with noises.

Accordingly, a hearing aid device is disclosed. The conventional hearing aid device allows a hearing-impaired person to correctly recognize the direction of a sound source in an environment. However, the foregoing conventional hearing aid device not further includes the functionality of noise attenuation. On the other hand, it is noted that, a hearing-impaired person should receive a hearing assessment to determine the type of hearing loss before purchasing a hearing aid device. Typically, hearing aid devices are sold by a hearing health care professional, who can perform a hearing assessment for the hearing-impaired person. After completing the hearing assessment, the hearing health care professional selects and tunes a hearing aid device according to the report of the hearing assessment. As a result, the hearing-impaired person wears the tuned hearing aid device regularly to help in significant improvement of hearing ability. However, the foregoing conventional hearing aid device fails to be tuned or adjusted by an easy way, for example, allowed to be tuned by using a smart phone or a laptop computer.

According to above descriptions, it is understood that there are still rooms for improvement in the conventional hearing aid device. In view of this fact, inventors of the present application have made great efforts to make inventive research and eventually provided a hearing aid device with functions of anti-noise and 3D sound recognition.

SUMMARY OF THE INVENTION

The primary objective of the present invention is to disclose a hearing aid device with functions of anti-noise and 3D sound recognition. According to the present invention, a reference signal generating module and an audio signal generating module are integrated in a hearing aid device, so as to make the hearing aid device further includes the functions of anti-noise and 3D sound recognition.

For achieving the primary objective mentioned above, the present invention provides an embodiment of the hearing aid device with functions of anti-noise and 3D sound recognition, comprising:

a plurality of microphones;

at least one analog-to-digital converter, being coupled to the plurality of microphones for receiving a plurality of analog audio signals, and converting the plurality of analog audio signals to a plurality of first digital audio signals;

a modular electronic device, being coupled to the analog-to-digital converter for receiving the plurality of first digital audio signals, and comprising:

a first module, being configured for generating a plurality of second digital audio signals through multiplying each said first digital audio signal by a head related transfer function, and generating a reference signal by conducting a first summation calculation of the plurality of second digital audio signals; and a second module, being configured for generating a first output signal by applying an active noise attenuating process to the reference signal, generating a second output signal by applying a hear-through process to the reference signal, and generating an output signal based on the first output signal and the second output signal;

at least one digital-to-analog converter, being coupled to the modular electronic device for receiving the output signal, and converting the output signal to an analog output signal; and a loudspeaker, being coupled to the digital-to-analog converter for receiving the analog output signal, and broadcasting a sound according to the analog output signal.

In one practicable embodiment, the hearing aid device further comprises a housing body for accommodating the plurality of microphones, the at least one analog-to-digital converter, the modular electronic device, and the at least one digital-to-analog converter.

In one embodiment, the housing body has a plurality of apertures, such that the plurality of microphones are exposed out of the housing body via the plurality of apertures, respectively, by a sound collecting element thereof.

In one embodiment, the modular electronic device comprises:

a first microprocessor;

a first memory, being coupled to the first microprocessor, and storing a first application program; and a first communication interface, being coupled to the first microprocessor;

wherein the first application program comprises a plurality of function programs, such that in case the first application program is executed, the first microprocessor being configured for performing a plurality of functions:

wherein the plurality of function program comprising:

a first function program, being compiled to be integrated in the first application program by a form of said first module through one type of programming language; and a second function program, being compiled to be integrated in the first application program by a form of said second module through one type of programming language.

In one embodiment, the first module comprises:

a multiplier, being configured for multiplying each said first digital audio signal by the head related transfer function; and an adder, being configured for generating the reference signal by conducting the first summation calculation of the plurality of second digital audio signals.

In one embodiment, the second module comprises:

a first filter, being configured for applying a first filtering process to the reference signal;

a first regulator, being coupled to the first filter for receiving the reference signal, and being configured for applying a first gain regulating process to the reference signal;

a second filter, being configured for applying a second filtering process to the reference signal;

a second regulator, being coupled to the second filter for receiving the reference signal, and being configured for applying a second gain regulating process to the reference signal;

a first adder, being coupled to the second regulator for receiving said second output signal, being coupled to an adjustment signal, and being configured for generating a third output signal by conducting a second summation calculation of the second output signal and the adjustment signal;

a second adder, being coupled to the first regulator for receiving said first output signal, being coupled to the first adder for receiving said third output signal, and being configured for generating said output signal by conducting a third summation calculation of the first output signal and the third output signal;

a first signal compensator, being configured for compensating an acoustic delay of the reference signal;

a second signal compensator, being configured for compensating an electronic delay of the output signal; and a first subtractor, being coupled to the first signal compensator for receiving a target signal, being coupled to the second signal compensator for receiving a fourth output signal, and being configured for generating an error signal e(n) by conducting a first subtraction calculation of the target signal d(n) and the fourth output signal.

In one practicable embodiment, the second module further comprises:

a shape filter, being coupled between the reference signal and the second filter, and being configured for transmitting the reference signal to the second filter after applying a third filtering process to the reference signal.

In one practicable embodiment, an electronic device having a second communication interface is allowed to communicate with the modular electronic device in case of the second communication interface being coupled to the first communication interface. The electronic device is selected from a group consisting of desktop computer, laptop computer, all-in-one computer, tablet computer, and smart phone.

In one embodiment, the electronic device comprises:

a second microprocessor;

a second memory, being coupled to the second microprocessor, and storing a second application program; and said second communication interface, being coupled to the second microprocessor;

wherein the second application program comprises a plurality of function programs, such that in case the second application program is executed, the second microprocessor being configured for performing a plurality of functions:

wherein the plurality of function program comprising:

a third function program, being compiled to be integrated in the second application program by a form of a second module through one type of programming language; and a fourth function program, being compiled to be integrated in the second application program by a form of a fourth module through one type of programming language.

In one embodiment, in case the third function program is executed, the second microprocessor is configured for adjusting at least one first filter parameter of the first filter by conducting an active noise control for the reference signal.

In one embodiment, in case the fourth function program is executed, the second microprocessor is configured for adjusting at least one second filter parameter of the second filter by conducting a hear-through control for the reference signal.

In one practicable embodiment, the plurality of function program further comprises a fifth function program that includes instructions for configuring the second microprocessor to conduct a gain regulating control for the first regulator or the second regulator.

In another one practicable embodiment, the plurality of function program further comprises a sixth function program that includes instructions for configuring the second microprocessor to change a width of a stopband or a width of a passband of the shape filter.

In one embodiment, the third module comprises:

one said first signal compensator, being configured for compensating the acoustic delay of the reference signal;

a first adaptive filter, being configured for applying a third filtering process to the reference signal;

one said second signal compensator, being coupled to the first adaptive filter for receiving said first output signal, and compensating the electronic delay of the first output signal;

a second subtractor, being coupled to the first signal compensator for receiving said target signal, being coupled to the second signal compensator for receiving a fifth output signal, and being configured for generating a first error signal by conducting a second subtraction calculation of the target signal and the fifth output signal;

a third signal compensator, being configured for compensating an estimation electronic delay of the reference signal; and a first adaptive controller, being coupled to the third signal compensator for receiving a first reference signal, and also being coupled to the second subtractor for receiving the first error signal;

wherein the first adaptive controller is configured to adaptively modulate the at least one filter parameter of the first adaptive filter according to the first reference signal and the first error signal, so as to make the first error signal approach zero.

In one embodiment, the fourth module comprises:

a fourth signal compensator, being configured for applying a signal compensating process to the reference signal;

a delay component, being coupled to the fourth signal compensator for receiving a first target signal, and applying a signal delay process to the first target signal;

a second adaptive filter, being configured for applying a fourth filtering process to the reference signal;

one said second signal compensator, being coupled to the second adaptive filter for receiving said second output signal, and compensating the electronic delay of the second output signal;

a third subtractor, being coupled to the delay component for receiving said target signal, being coupled to second signal compensator for receiving a sixth output signal, and being configured for generating a second error signal by conducting a third subtraction calculation of the target signal and the sixth output signal;

one said third signal compensator, being configured for compensating the estimation electronic delay of the reference signal; and a second adaptive controller, being coupled to the third signal compensator for receiving a second reference signal, and also being coupled to the third subtractor for receiving the second error signal;

wherein the second adaptive controller is configured to adaptively modulate the at least one filter parameter of the second adaptive filter according to the second reference signal and the second error signal, so as to make the second error signal approach zero.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a hearing aid device with functions of anti-noise and 3D sound recognition according to the present invention, embodiments of the present invention will be described in detail with reference to the attached drawings hereinafter.

Figure 1:
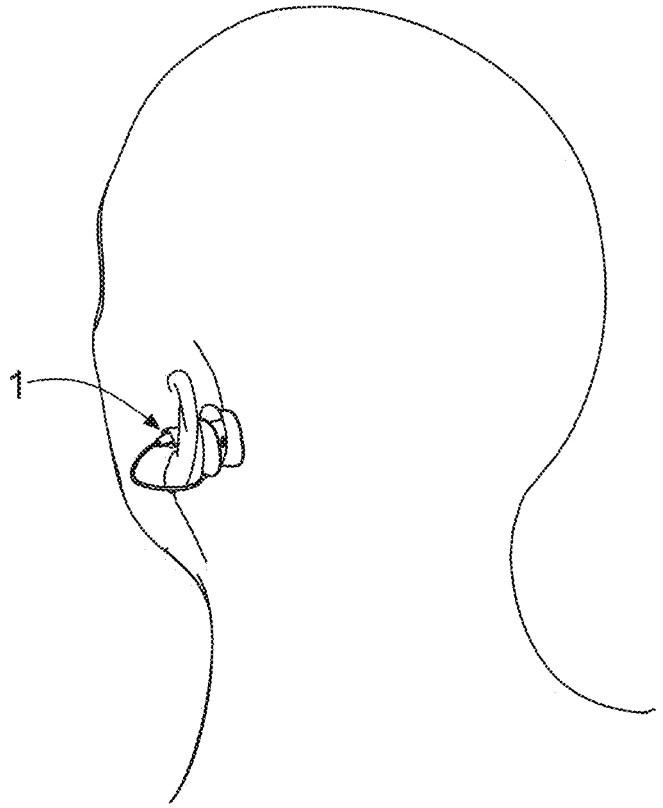
FIG. 1 shows a diagram for depicting the application of a hearing aid device with functions of anti-noise and 3D sound recognition according to the present invention.
Figure 2:
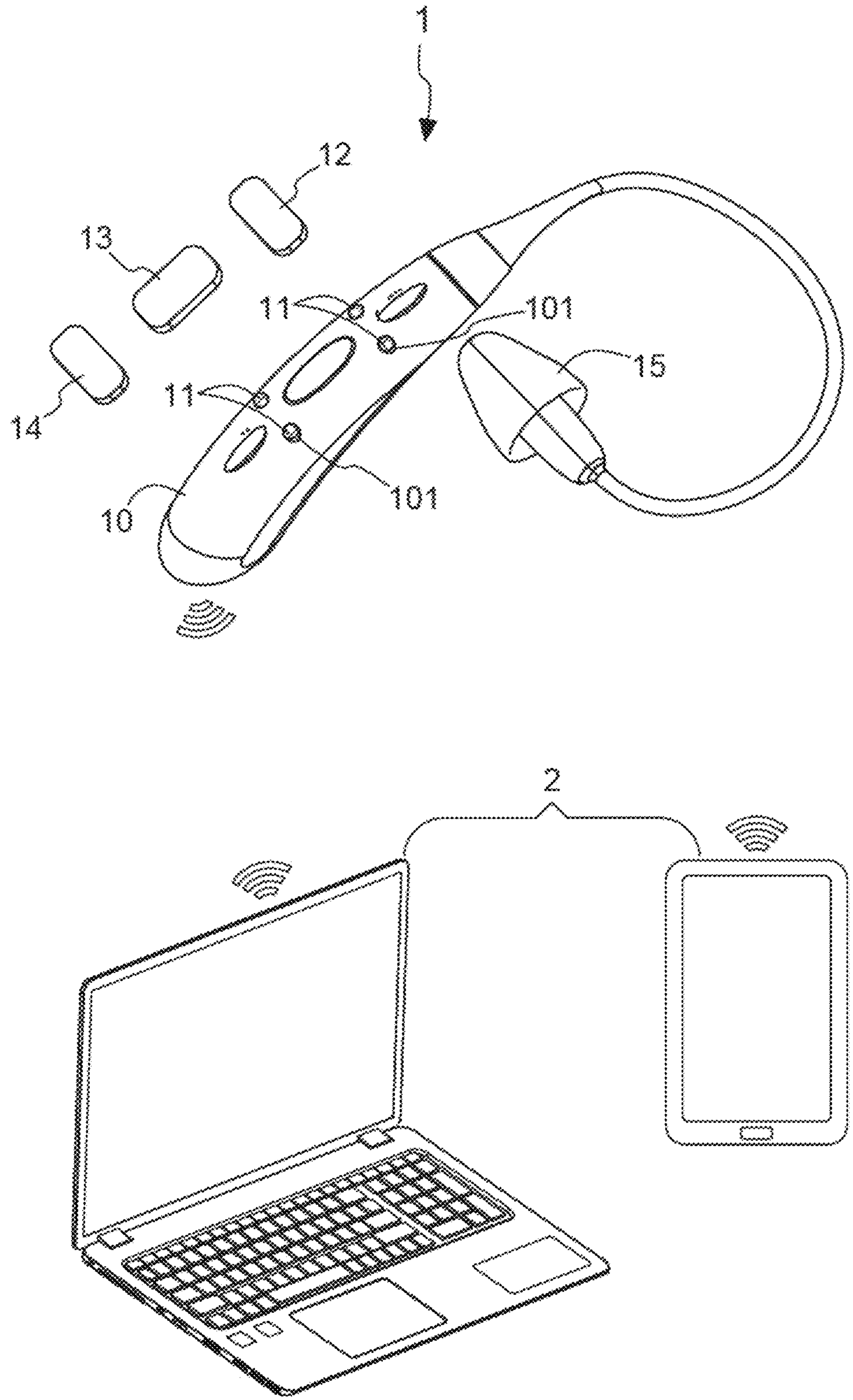
FIG. 2 shows an exemplary stereo diagram of the hearing aid device according to the present invention.
Figure 3:
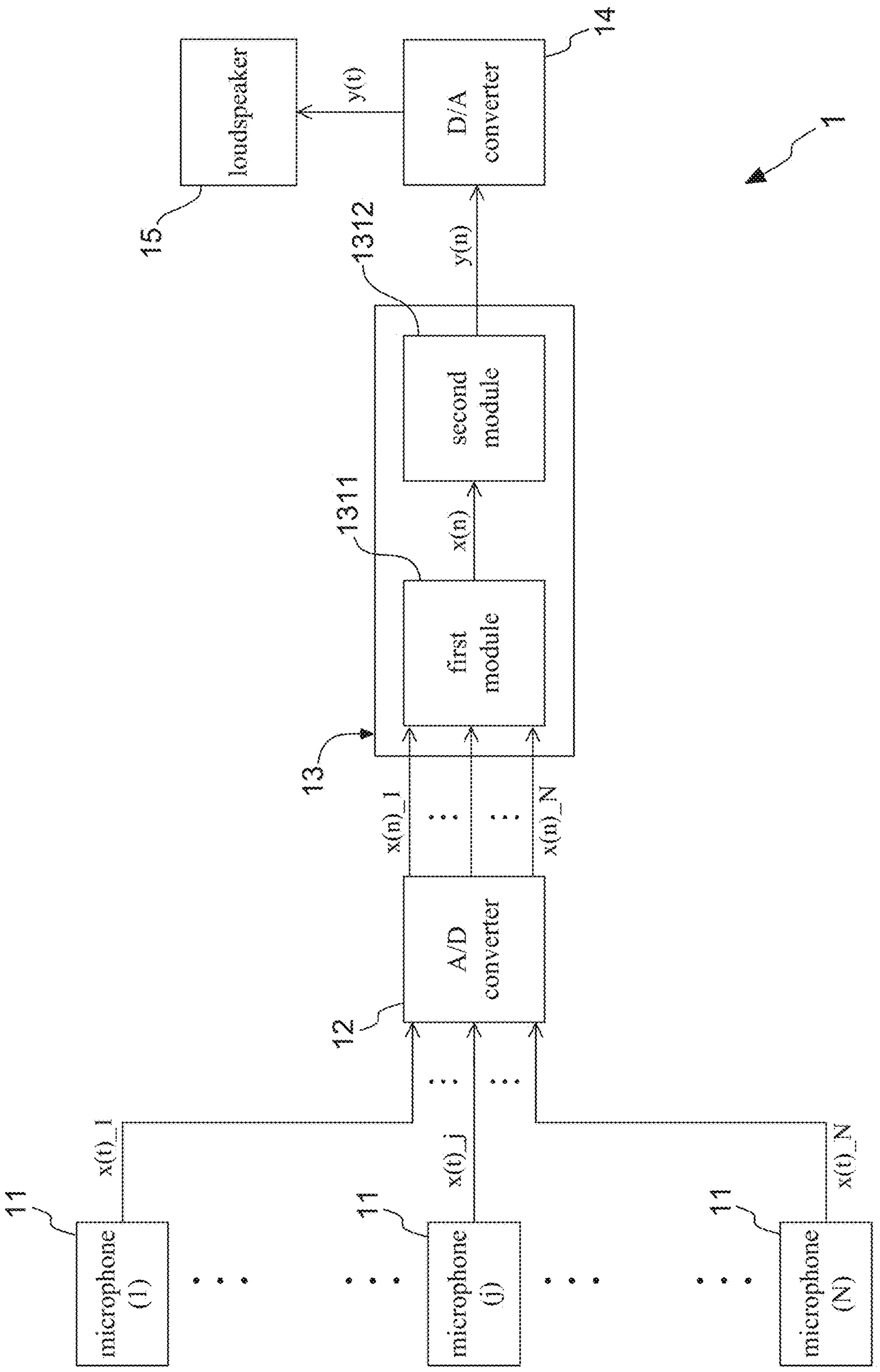
FIG. 3 shows a block diagram of the hearing aid device according to the present invention.

With reference to FIG. 1, there is provided a diagram for depicting the application of a hearing aid device with functions of anti-noise and 3D sound recognition according to the present invention. On the other hand, FIG. 2 shows an exemplary stereo diagram of the hearing aid device with functions of anti-noise and 3D sound recognition. Furthermore, FIG. 3 illustrates a block diagram of the hearing aid device. As FIG. 1, FIG. 2 and FIG. 3 show, a modular electronic device 13 provided with a first module 1311 and a second module 1312 is integrated in a hearing aid device 1, so as to make the hearing aid device 1 further includes the functions of anti-noise and 3D sound recognition.

According to the present invention, the hearing aid device 1 comprises a plurality of microphones 11, at least one analog-to-digital (A/D) converter 12, said modular electronic device 13, at least one digital-to-analog (D/A) converter 14, and a loudspeaker 15. In addition, FIG. 2 depicts that the hearing aid device 1 further comprises a housing body 10 for accommodating the plurality of microphones 11, the at least one A/D converter 12, the modular electronic device 13, and the at least one D/A converter 14. As described in more detail below, the housing body 10 has a plurality of apertures 11, such that the plurality of microphones 11 are exposed out of the housing body 10 via the plurality of apertures 11, respectively, by a sound collecting element thereof. As FIG. 2 and FIG. 3 show, the A/D converter 12 are coupled to the plurality of microphones 11 for receiving a plurality of analog audio signals, and converts the plurality of analog audio signals (x(t)_1, . . . , x(t)_j, . . . , x(t)_N) to a plurality of first digital audio signals (x(n)_1, . . . , x(n)_j, . . . , x(n)_N).

Figure 4:
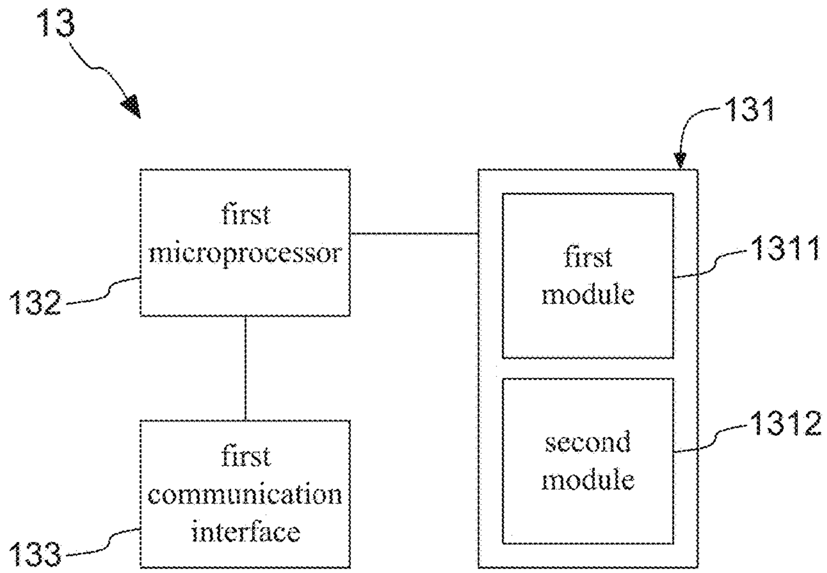
FIG. 4 shows a block diagram of a modular electronic device as shown in FIG. 2.

FIG. 4 shows a block diagram of a modular electronic device as shown in FIG. 2. As FIG. 2, FIG. 3 and FIG. 4 show, the modular electronic device 13 is coupled to the A/D converter 12 for receiving the plurality of first digital audio signals (x(n)_1, . . . , x(n)_j, . . . , x(n)_N), and comprises a first microprocessor 132, a first memory 131 and a first communication interface 133, wherein the first memory 131 and the first communication interface 133 are coupled to the first microprocessor 132. Particularly, a first application program comprising a plurality of function programs is stored in the first memory 131, such that in case the first application program is executed, the first microprocessor 132 is configured for performing a plurality of functions. Specifically, the plurality of function program comprises a first function program and a second function program. According to the present invention, the first function program is compiled to be integrated in the first application program by a form of a first module 1311 through one type of programming language. Moreover, the second function program is compiled to be integrated in the first application program by a form of a second module 1312 through one type of programming language.

Figure 5:
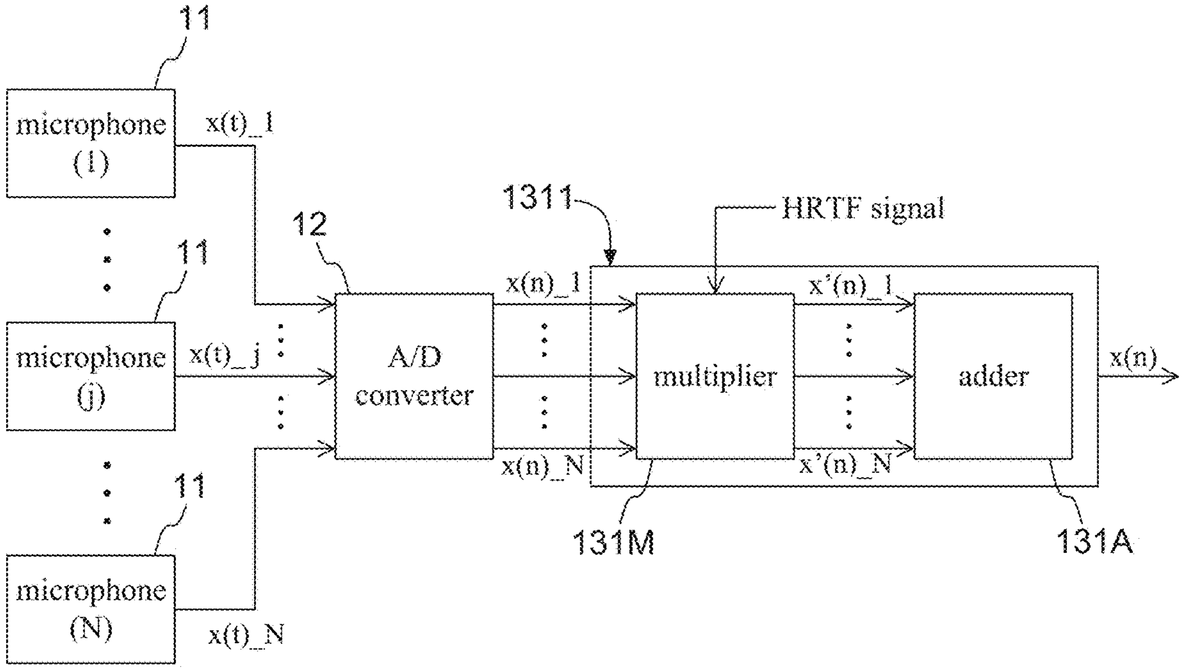
FIG. 5 shows a block diagram of a first module as shown in FIG. 3.

FIG. 5 illustrates a block diagram of a first module as shown in FIG. 3. As FIG. 3, FIG. 4 and FIG. 5 show, in case of the first module 1311 (i.e., the first function program) is executed, the first microprocessor 132 is configure to generate a plurality of second digital audio signals (x'(n)_1, . . . , x'(n)_j, . . . , x'(n)_N) through multiplying each said first digital audio signal by a head related transfer function (i.e., HRTF signal), and generate a reference signal x(n) by conducting a first summation calculation of the plurality of second digital audio signals. In one embodiment, the first module 1311 comprises a multiplier 131M and an adder 131A, of which the multiplier 131M is adopted for multiplying each said first digital audio signal by the HRTF signal, and the adder 131A is used for generating the reference signal x(n) by conducting the first summation calculation of the plurality of second digital audio signals (x'(n)_1, . . . , x'(n)_j, . . . , x'(n)_N). Briefly speaking, the reference signal x(n) contains sounds collected from a three dimensional space (i.e., 3D sounds source).

Figure 6:
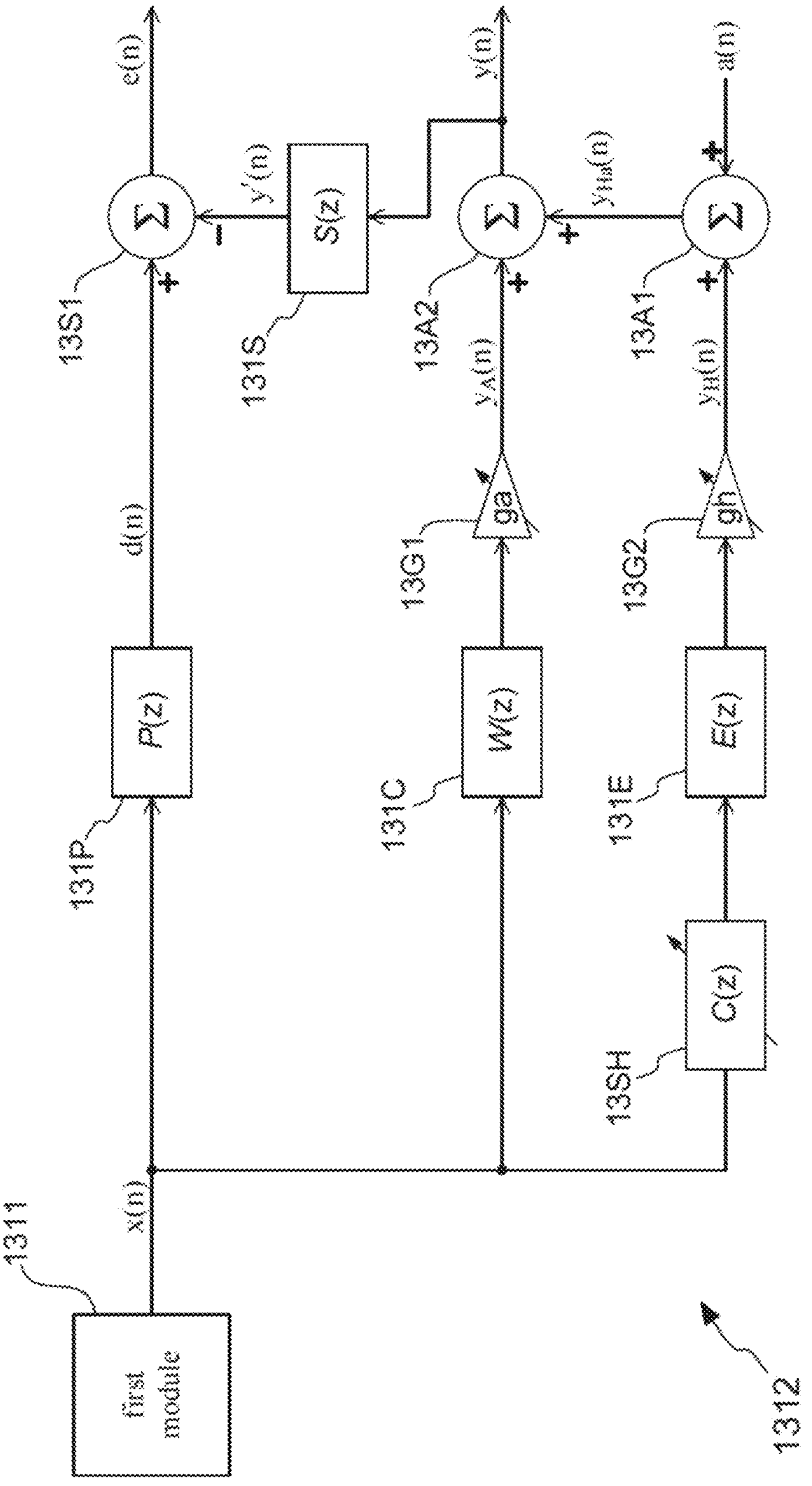
FIG. 6 shows a block diagram of a second module as shown in FIG. 3.

FIG. 6 illustrates a block diagram of a second module as shown in FIG. 3. As FIG. 3, FIG. 4 and FIG. 6 show, in case of the second module 1312 (i.e., the second function program) is executed, the first microprocessor 132 is configure to generate a first output signal $y_A(n)$ by applying an active noise attenuating process to the reference signal x(n), generate a second output signal $y_H(n)$ by applying a hear-through process to the reference signal x(n), and generate an output signal y(n) based on the first output signal $y_A(n)$ and the second output signal $y_H(n)$. According to the present invention, the second module 1312 comprises: a first filter 131C, a first regulator 13G1, a second filter 131E, a second regulator 13G2, a first adder 13A1, a second adder 13A2, a first signal compensator 131P, a second signal compensator 131S, and a first subtractor 13S1.

Engineers skilled in development and manufacture of active noise control (ANC) system certainly know that, when the electric delay occurring in a secondary path exceeds the acoustic delay occurring in a primary path, the causality constraint will be violated. In other words, it needs to ensure that the acoustic delay is greater than the electric delay. Therefore, there is a first signal compensator 131P and a second compensator 131P provided in the ANC system (i.e., the second module 1312), of which the first signal compensator 131P is configured for compensating an acoustic delay of a reference signal x(n), and the second signal compensator 131S is configured for compensating an electronic delay of a specific signal like the output signal y(n). It is worth noting that, the first signal compensator 131P is symbolled as P(z), and the second signal compensator 131S is symbolled as S(z).

As described in more detail below, the first filter 131C, a control filter, is configured for applying a first filtering process to the reference signal x(n). On the other hand, the second filter 131E is a equalization filter configured for applying a second filtering process to the reference signal x(n). As FIG. 6 shows, the first regulator 13G1 is coupled to the first filter 131C for receiving the reference signal x(n), and is configured for applying a first gain regulating process to the reference signal x(n). Moreover, the second regulator 13G2 is coupled to the second filter 131E for receiving the reference signal x(n), and is configured for applying a second gain regulating process to the reference signal x(n).

According to the present invention, the first adder 13A1 is coupled to the second regulator 13G2 for receiving said second output signal $y_H(n)$, is coupled to an adjustment signal a(n), and is configured for generating a third output signal $y_{Ha}(n)$ by conducting a second summation calculation of the second output signal $y_H(n)$ and the adjustment signal a(n). On the other hand, the second adder 13A2 is coupled to the first regulator 13G1 for receiving said first output signal $y_A(n)$, is coupled to the first adder 13A1 for receiving said third output signal $y_{Ha}(n)$, and is configured for generating said output signal y(n) by conducting a third summation calculation of the first output signal $y_A(n)$ and the third output signal $y_{Ha}(n)$. It needs to further explain that, the second signal compensator 131S (i.e., S(z)) is coupled to the second adder 13A2 for receiving the output signal y(n), and generates a fourth output signal y'(n) after compensates an electronic delay of the output signal y(n). On the other hand, the first signal compensator 131P (i.e., P(z)) is coupled to the first module 1311 for receiving the reference signal x(n), and generates a target signal d(n) after compensates an acoustic delay of the reference signal x(n). As FIG. 6 shows, the first subtractor 13S1 is coupled to the first signal compensator 131P for receiving the target signal d(n), is coupled to the second signal compensator 131S for receiving the fourth output signal y'(n), and is configured for generating an error signal e(n) by conducting a first subtraction calculation of the target signal d(n) and the fourth output signal y'(n).

In a practicable embodiment, the second module 1312 is allowed to be further provided with a shape filter 13SH therein. As FIG. 6 shows, the shape filter 13SH is coupled between the reference signal x(n) and the second filter 131E, and is configured for transmitting the reference signal x(n) to the second filter 131E after applying a third filtering process to the reference signal x(n).

Please refer to FIG. 2 and FIG. 3 again. The D/A converter 14 is coupled to the modular electronic device 13 for receiving the output signal y(n), and converts the output signal y(n) to an analog output signal y(t). Moreover, the loudspeaker 15 is coupled to the digital-to-analog converter 14 for receiving the analog output signal y(t), and consequently broadcasts a sound according to the analog output signal y(t). Since the sound has received a noise attenuation treatment and a hear-through treatment, a hearing-impaired person wearing this hearing aid device 1 is not only able to recognize the direction of the sound source, but also can pay attention on a specific kind of sound (e.g., speaking sound) he interests.

As FIG. 2 shows, an electronic device 2 having a second communication interface 23 is allowed to communicate with the modular electronic device 13 in case of the second communication interface 23 being coupled to the first communication interface 133, wherein the electronic device 2 can be a desktop computer, a laptop computer, an all-in-one computer, a tablet computer, or a smart phone. For example, a hearing health care professional like an ophthalmologist can operate his personal computer to communicate with the hearing aid device 1, and a hearing-impaired person can also operate his smart phone to communicate with the hearing aid device 1.

Figure 7:
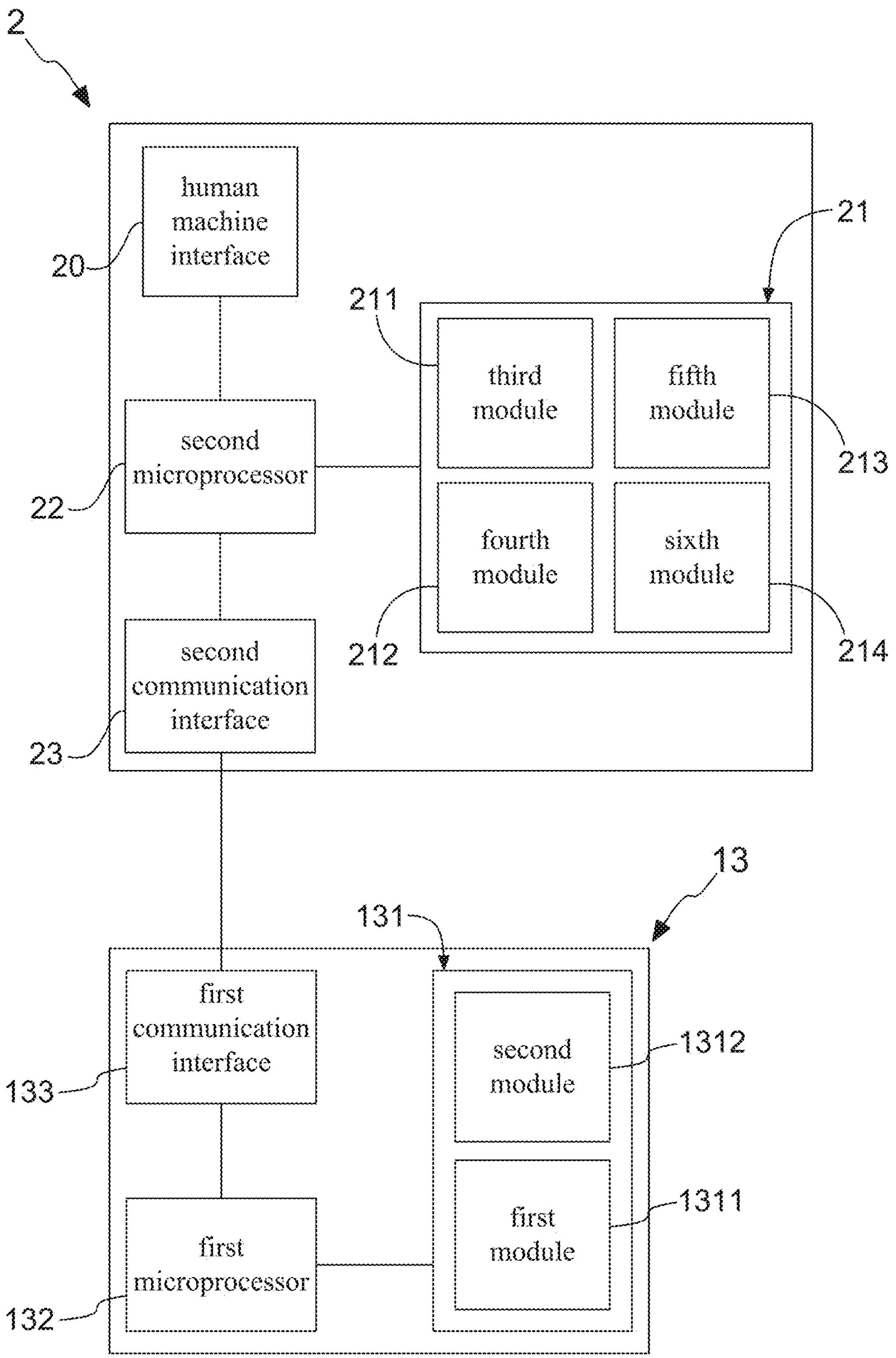
FIG. 7 shows a block diagram of an electronic device as shown in FIG. 1.

FIG. 7 shows a block diagram of an electronic device as shown in FIG. 1. As FIG. 2 and FIG. 7 show, the electronic device 2 comprises a second microprocessor 22, a second memory 21, said second communication interface 23, and a human machine interface 20, wherein the second memory 21, the second communication interface 23 and the human machine interface 20 are all coupled to the second microprocessor 2. Particularly, a second application program comprising a plurality of function programs is stored in second first memory 21, such that in case the second application program is executed, the second microprocessor 22 is configured for performing a plurality of functions. Specifically, the plurality of function program comprises a third function program, a fourth function program, a fifth function program, and a six function program. According to the present invention, the first function program is compiled to be integrated in the second application program by a form of a third module 211 through one type of programming language. Moreover, the fourth function program is compiled to be integrated in the second application program by a form of a fourth module 212 through one type of programming language. On the other hand, the fifth function program is compiled to be integrated in the second application program by a form of a fifth module 213 through one type of programming language. In addition, the sixth function program is compiled to be integrated in the second application program by a form of a sixth module 214 through one type of programming language.

Figure 8:
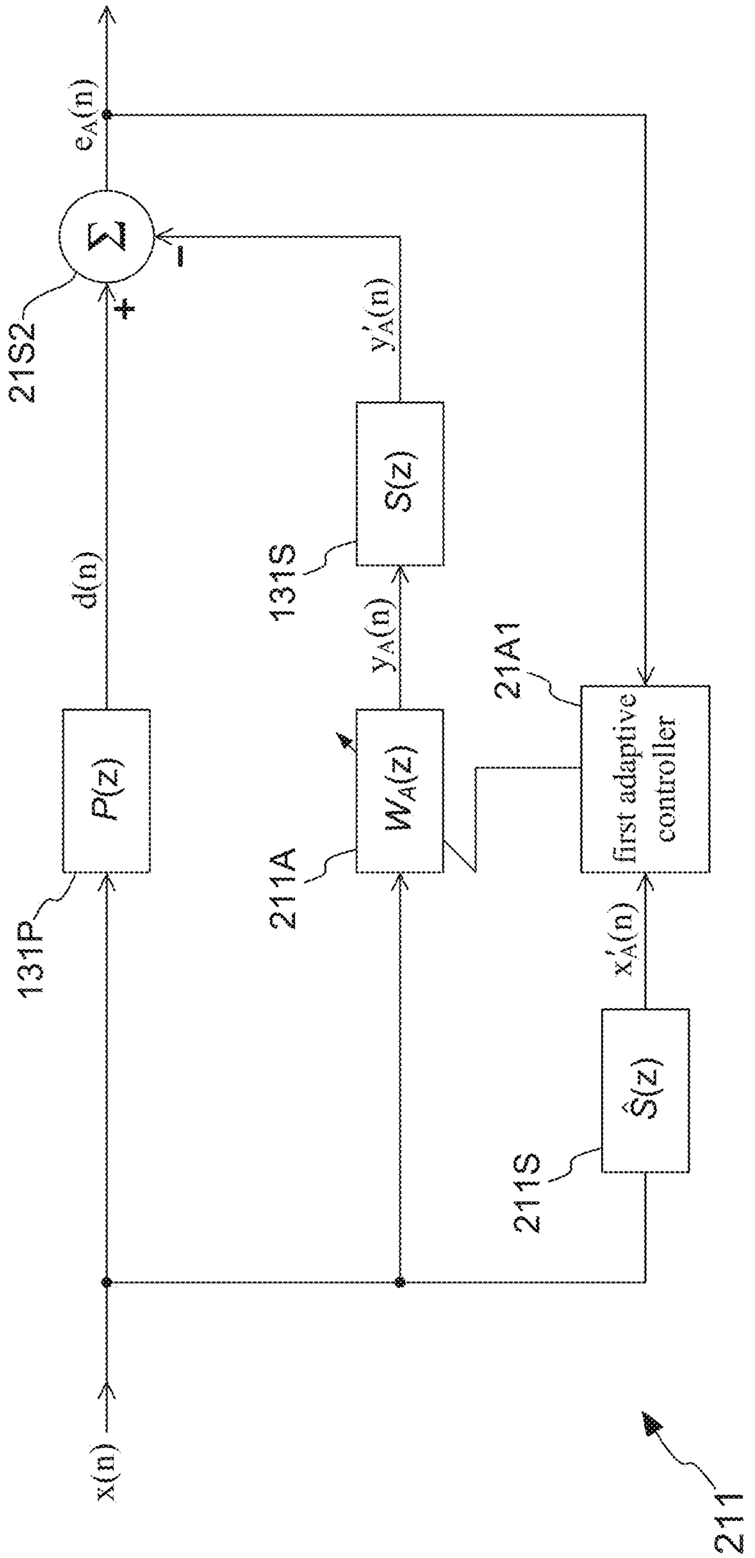
FIG. 8 shows a system framework view of a third module as shown in FIG. 7.

In one embodiment, After the second application program is installed in a smart phone (i.e., the electronic device 2), the touch screen of the smart phone becomes the human machine interface 20. As such, user is allowed to execute the third module 211 by operating the human machine interface 20, such that the second microprocessor 22 is configured for adjusting at least one first filter parameter of the first filter 131C (i.e., control filter) by conducting an active noise control for the reference signal x(n). FIG. 8 illustrates a system framework view of a third module as shown in FIG. 7. As FIG. 8 show, the third module 211 is an active noise control (ANC) system, comprising: one said first signal compensator 131P, a first adaptive filter 211A, one said second signal compensator 131S, a second subtractor 2152, a third signal compensator 211S, and a first adaptive controller 21A1, of which the first signal compensator 131P is configured for compensating the acoustic delay of the reference signal x(n), and the first adaptive filter 211A is configured for applying a third filtering process to the reference signal x(n), so as to generate a first output signal $y_A(n)$. On the other hand, the second signal compensator 131S is coupled to the first adaptive filter 211A for receiving said first output signal $y_A(n)$, and compensating the electronic delay of the first output signal $y_A(n)$.

As described in more detail below, the second subtractor 2152 is coupled to the first signal compensator 131P for receiving said target signal d(n), is coupled to the second signal compensator 131S for receiving a fifth output signal $y_A'(n)$, and is configured for generating a first error signal $e_A(n)$ by conducting a second subtraction calculation of the target signal d(n) and the fifth output signal $y_A'(n)$. As FIG. 8 shows, the third signal compensator 211S is configured for compensating an estimation electronic delay of the reference signal x(n), and the first adaptive controller 21A1 is coupled to the third signal compensator 211S for receiving a first reference signal $x_A'(n)$, and is also coupled to the second subtractor 2152 for receiving the first error signal $e_A(n)$.

After the third module 211 (i.e., ANC system) is executed, the first adaptive controller 21A1 is configured to modulate the at least one filter parameter of the first adaptive filter 211A according to the first reference signal $x_A'(n)$ and the first error signal $e_A(n)$, so as to make the first error signal $e_A(n)$ approach zero. Engineers skilled in development and manufacture of the ANC system certainly know that, the first adaptive controller 21A1 is a mathematical algorithm like least mean square (LMA) algorithm. Of course, any other suitable mathematical algorithms can be adopted as the first adaptive controller 21A1, such as normalized least mean square (NLMS) algorithm. On the other hand, the third signal compensator 211S can be a finite impulse response (FIR) filter or an infinite impulse response (IIR) filter.

Figure 9:
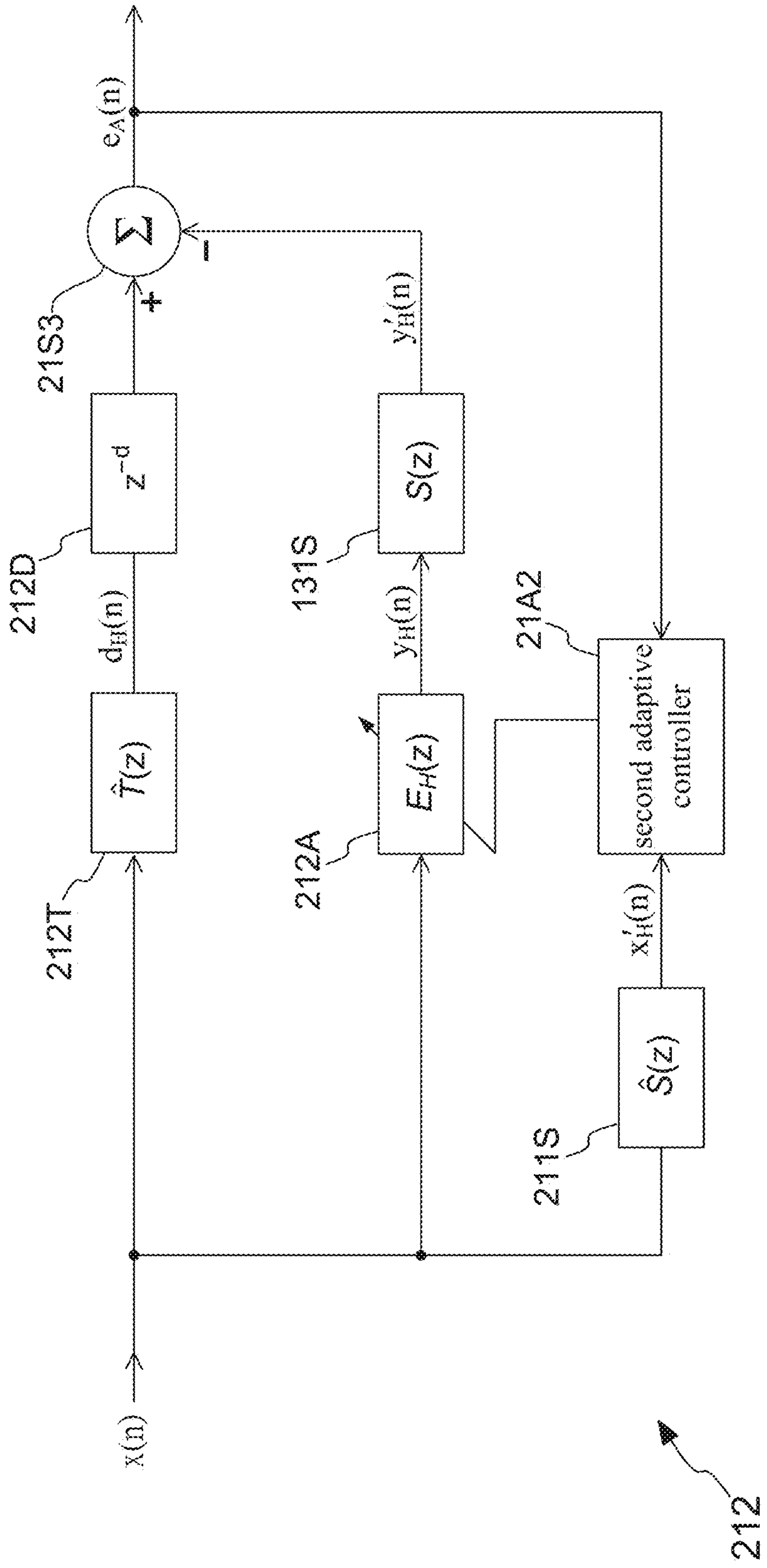
FIG. 9 shows a system framework view of a fourth module as shown in FIG. 7.

In addition, user is also allowed to execute the fourth module 212 by operating the human machine interface 20, such that the second microprocessor 22 is configured for adjusting at least one second filter parameter of the second filter 131E (equalization filter) by conducting a hear-through control for the reference signal x(n). FIG. 9 illustrates a system framework view of a fourth module as shown in FIG. 7. As FIG. 9 show, the fourth module 212 is a hear-through control (HTC) system, comprising: a fourth signal compensator 212T, a delay component 212D, a second adaptive filter 21A2, one said second signal compensator 131S, a third subtractor 21S3, one said third signal compensator 211S, and a second adaptive controller 21A2.

According to the present invention, the fourth signal compensator 212T is configured for applying a signal compensating process to the reference signal x(n), so as to generate a first target signal $d_H(n)$, and the delay component 212D is coupled to the fourth signal compensator 212T for receiving the first target signal $d_H(n)$, so as to apply a signal delay process to the first target signal $d_H(n)$. On the other hand, the second adaptive filter 21A2 is configured for applying a fourth filtering process to the reference signal x(n), and the second signal compensator 131S is coupled to the second adaptive filter 212A for receiving said second output signal $y_H(n)$, thereby compensating the electronic delay of the second output signal $y_H(n)$. As FIG. 9 shows, the third subtractor 2153 is coupled to the delay component 212D for receiving said target signal d(n), is coupled to second signal compensator 131S for receiving a sixth output signal $y'_H(n)$, and is configured for generating a second error signal $e_H(n)$ by conducting a third subtraction calculation of the target signal d(n) and the sixth output signal $y'_H(n)$. On the other hand, the third signal compensator 211S is configured for compensating the estimation electronic delay of the reference signal x(n), and the second adaptive controller 21A2 is coupled to the third signal compensator 211S and the third subtractor 21S3 for receiving a second reference signal $x'_H(n)$ and the second error signal $e_H(n)$.

After the fourth module 212 (i.e., HTC system) is executed, the second adaptive controller 21A2 is configured to adaptively modulate the at least one filter parameter of the second adaptive filter 212A according to the second reference signal $x'_H(n)$ and the second error signal $e_H(n)$, so as to make the second error signal $e_H(n)$ approach zero. Engineers skilled in development and manufacture of the HTC system certainly know that, the second adaptive controller 21A2 is a mathematical algorithm like least mean square (LMA) algorithm. Of course, any other suitable mathematical algorithms can be adopted as the second adaptive controller 21A2, such as normalized least mean square (NLMS) algorithm.

Please refer to FIG. 2 and FIG. 7 again. User is also allowed to execute the fifth module 213 (i.e., fifth function program) by operating the human machine interface 20, such that the second microprocessor 22 is configured to conduct a gain regulating control for the first regulator 13G1 or the second regulator 13G2. In addition, user is also allowed to execute the sixth module 214 (i.e., sixth function program) by operating the human machine interface 20, such that the second microprocessor 22 is configured to change a width of a stopband or a width of a passband of the shape filter 13SH.

Therefore, through above descriptions, all embodiments and their constituting elements of the hearing aid device with functions of anti-noise and 3D sound recognition according to the present invention have been introduced completely and clearly. Moreover, the above description is made on embodiments of the present invention. However, the embodiments are not intended to limit the scope of the present invention, and all equivalent implementations or alterations within the spirit of the present invention still fall within the scope of the present invention.

What is claimed is:

1. A hearing aid device with functions of anti-noise and 3D sound recognition, comprising:

a plurality of microphones;

at least one analog-to-digital converter, being coupled to the plurality of microphones for receiving a plurality of analog audio signals, and converting the plurality of analog audio signals to a plurality of first digital audio signals;

a modular electronic device, being coupled to the analog-to-digital converter for receiving the plurality of first digital audio signals, and comprising:

a first module, being configured for generating a plurality of second digital audio signals through multiplying each said first digital audio signal by a head related transfer function, and generating a reference signal by conducting a first summation calculation of the plurality of second digital audio signals; and a second module, being configured for generating a first output signal by applying an active noise attenuating process to the reference signal, generating a second output signal by applying a hear-through process to the reference signal, and generating an output signal based on the first output signal and the second output signal;

at least one digital-to-analog converter, being coupled to the modular electronic device for receiving the output signal, and converting the output signal to an analog output signal; and a loudspeaker, being coupled to the digital-to-analog converter for receiving the analog output signal, and broadcasting a sound according to the analog output signal.

2. The hearing aid device of claim 1, further comprising a housing body for accommodating the plurality of microphones, the at least one analog-to-digital converter, the modular electronic device, and the at least one digital-to-analog converter.

3. The hearing aid device of claim 2, wherein the housing body has a plurality of apertures, such that the plurality of microphones are exposed out of the housing body via the plurality of apertures, respectively, by a sound collecting element thereof.

4. The hearing aid device of claim 1, wherein the modular electronic device 13 comprises:

a first microprocessor;

a first memory, being coupled to the first microprocessor, and storing a first application program; and a first communication interface, being coupled to the first microprocessor;

wherein the first application program comprises a plurality of function programs, such that in case the first application program is executed, the first microprocessor being configured for performing a plurality of functions:

wherein the plurality of function program comprising:

a first function program, being compiled to be integrated in the first application program by a form of said first module through one type of programming language; and a second function program, being compiled to be integrated in the first application program by a form of said second module through one type of programming language.

5. The hearing aid device of claim 4, wherein the first module 1311 comprises:

a multiplier, being configured for multiplying each said first digital audio signal by the head related transfer function; and an adder, being configured for generating the reference signal by conducting the first summation calculation of the plurality of second digital audio signals.

6. The hearing aid device of claim 5, wherein the second module comprises:

a first filter, being configured for applying a first filtering process to the reference signal;

a first regulator, being coupled to the first filter for receiving the reference signal, and being configured for applying a first gain regulating process to the reference signal;

a second filter, being configured for applying a second filtering process to the reference signal;

a second regulator, being coupled to the second filter for receiving the reference signal, and being configured for applying a second gain regulating process to the reference signal;

a first adder, being coupled to the second regulator for receiving said second output signal, being coupled to an adjustment signal, and being configured for generating a third output signal by conducting a second summation calculation of the second output signal and the adjustment signal;

a second adder, being coupled to the first regulator for receiving said first output signal, being coupled to the first adder for receiving said third output signal, and being configured for generating said output signal by conducting a third summation calculation of the first output signal and the third output signal;

a first signal compensator, being configured for compensating an acoustic delay of the reference signal;

a second signal compensator, being configured for compensating an electronic delay of the output signal; and a first subtractor, being coupled to the first signal compensator for receiving a target signal, being coupled to the second signal compensator for receiving a fourth output signal, and being configured for generating an error signal by conducting a first subtraction calculation of the target signal and the fourth output signal.

7. The hearing aid device of claim 6, wherein the second module 1312 further comprises:

a shape filter, being coupled between the reference signal and the second filter, and being configured for transmitting the reference signal to the second filter after applying a third filtering process to the reference signal.

8. The hearing aid device of claim 6, wherein an electronic device having a second communication interface is allowed to communicate with the modular electronic device in case of the second communication interface being coupled to the first communication interface.

9. The hearing aid device of claim 8, wherein the electronic device is selected from a group consisting of desktop computer, laptop computer, all-in-one computer, tablet computer, and smart phone.

10. The hearing aid device of claim 8, wherein the electronic device 2 comprises:

a second microprocessor;

a second memory, being coupled to the second microprocessor, and storing a second application program; and said second communication interface, being coupled to the second microprocessor;

wherein the second application program comprises a plurality of function programs, such that in case the second application program is executed, the second microprocessor being configured for performing a plurality of functions:

wherein the plurality of function program comprising:

a third function program, being compiled to be integrated in the second application program by a form of a third module through one type of programming language; and a fourth function program, being compiled to be integrated in the second application program by a form of a fourth module through one type of programming language.

11. The hearing aid device of claim 10, wherein in case the third function program is executed, the second microprocessor being configured for adjusting at least one first filter parameter of the first filter by conducting an active noise control for the reference signal.

12. The hearing aid device of claim 10, wherein in case the fourth function program is executed, the second microprocessor being configured for adjusting at least one second filter parameter of the second filter by conducting a hear-through control for the reference signal.

13. The hearing aid device of claim 10, wherein the plurality of function program further comprises a fifth function program that includes instructions for configuring the second microprocessor to conduct a gain regulating control for the first regulator or the second regulator.

14. The hearing aid device of claim 13, wherein the plurality of function program further comprises a sixth function program that includes instructions for configuring the second microprocessor to change a width of a stopband or a width of a passband of the shape filter.

15. The hearing aid device of claim 10, wherein the third module comprises:

one said first signal compensator, being configured for compensating the acoustic delay of the reference signal;

a first adaptive filter, being configured for applying a third filtering process to the reference signal;

one said second signal compensator, being coupled to the first adaptive filter for receiving said first output signal, and compensating the electronic delay of the first output signal;

a second subtractor, being coupled to the first signal compensator for receiving said target signal, being coupled to the second signal compensator for receiving a fifth output signal, and being configured for generating a first error signal by conducting a second subtraction calculation of the target signal and the fifth output signal;

a third signal compensator, being configured for compensating an estimation electronic delay of the reference signal; and a first adaptive controller, being coupled to the third signal compensator for receiving a first reference signal, and also being coupled to the second subtractor for receiving the first error signal;

wherein the first adaptive controller is configured to adaptively modulate the at least one filter parameter of the first adaptive filter according to the first reference signal and the first error signal, so as to make the first error signal approach zero.

16. The hearing aid device of claim 15, wherein the fourth module comprises:

a fourth signal compensator, being configured for applying a signal compensating process to the reference signal;

a delay component, being coupled to the fourth signal compensator for receiving a first target signal, and applying a signal delay process to the first target signal;

a second adaptive filter, being configured for applying a fourth filtering process to the reference signal;

one said second signal compensator, being coupled to the second adaptive filter for receiving said second output signal, and compensating the electronic delay of the second output signal;

a third subtractor, being coupled to the delay component for receiving said target signal, being coupled to second signal compensator for receiving a sixth output signal, and being configured for generating a second error signal by conducting a third subtraction calculation of the target signal and the sixth output signal;

one said third signal compensator, being configured for compensating the estimation electronic delay of the reference signal; and a second adaptive controller, being coupled to the third signal compensator for receiving a second reference signal, and also being coupled to the third subtractor for receiving the second error signal;

wherein the second adaptive controller is configured to adaptively modulate the at least one filter parameter of the second adaptive filter according to the second reference signal and the second error signal, so as to make the second error signal approach zero.

* * * * *